US012142397B2

(12) United States Patent
Suzuki et al.

(10) Patent No.: US 12,142,397 B2
(45) Date of Patent: Nov. 12, 2024

(54) WIRING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takahiro Suzuki, Mie (JP); Nobutaka Hamanishi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 334 days.

(21) Appl. No.: 17/601,689

(22) PCT Filed: Jan. 9, 2020

(86) PCT No.: PCT/JP2020/000369
§ 371 (c)(1),
(2) Date: Oct. 5, 2021

(87) PCT Pub. No.: WO2020/208885
PCT Pub. Date: Oct. 15, 2020

(65) Prior Publication Data
US 2022/0215983 A1    Jul. 7, 2022

(30) Foreign Application Priority Data
Apr. 10, 2019    (JP) .................................. 2019-074938

(51) Int. Cl.
*H01B 7/08*        (2006.01)
*B60R 16/02*       (2006.01)
*H02G 3/04*        (2006.01)

(52) U.S. Cl.
CPC ....... *H01B 7/0823* (2013.01); *B60R 16/0215* (2013.01); *H02G 3/0406* (2013.01)

(58) Field of Classification Search
CPC ... H01B 7/02; H01B 7/04; H01B 7/06; H01B 7/08; H01B 7/0823; H01B 7/0846;
(Continued)

(56) References Cited

U.S. PATENT DOCUMENTS 3,357,455 A * 12/1967 Plummer ................ F16L 3/233
174/DIG. 11
4,732,628 A *  3/1988 Dienes ................ H02G 15/117
156/48

(Continued)

FOREIGN PATENT DOCUMENTS

JP    H10-042423 A    2/1998
JP    2003-079034 A    3/2003
(Continued)

OTHER PUBLICATIONS

International Search Report issued on Mar. 17, 2020 for WO 2020/208885 A1 (4 pages).

*Primary Examiner* — William H. Mayo, III
(74) *Attorney, Agent, or Firm* — Venjuris, P.C.

(57) ABSTRACT

A wiring member includes a plurality of wires and a holding member for holding the plurality of wires. The plurality of wires include a power line and a communication line that extend in the same direction. The holding member includes a plurality of wire holding portions that each can hold a wire at a fixed position. The power line is held by a first wire holding portion of the plurality of wire holding portions. The communication line is held by a second wire holding portion (Continued)

of the plurality of wire holding portions. At least one of the plurality of wire holding portions is formed to be capable of retrofittably holding the wire.

5 Claims, 4 Drawing Sheets

(58) Field of Classification Search
CPC .. H01B 7/0838; H01B 7/0861; H01B 7/0892; H01B 11/20; H01B 13/53; B60R 16/0215; H02G 3/0406; H01R 43/24
USPC ... 174/47 F, 71 R, 72 R, 72 A, 72 TR, 74 R, 174/110 R, 113 R, 117 R, 117 F, 117 FF
See application file for complete search history.

(56) References Cited

U.S. PATENT DOCUMENTS

| | | | |
|---|---|---|---|
| 4,755,629 A * | 7/1988 | Beggs | H01B 11/02 174/34 |
| 7,112,745 B2 * | 9/2006 | Hatori | H01R 4/22 174/74 A |
| 7,465,879 B2 * | 12/2008 | Glew | H01B 7/0892 174/113 C |
| 7,772,494 B2 * | 8/2010 | Vexler | H01B 11/04 174/113 C |
| 10,424,868 B2 * | 9/2019 | Li | H01R 43/24 |
| 2006/0096777 A1 * | 5/2006 | Glew | H01B 11/04 174/113 C |
| 2006/0237219 A1 * | 10/2006 | Glew | H01B 7/0892 174/113 C |
| 2007/0209823 A1 * | 9/2007 | Vexler | H01B 11/06 174/113 C |
| 2010/0263907 A1 * | 10/2010 | Vexler | H01B 11/06 174/113 C |
| 2013/0068522 A1 | 3/2013 | Ogawa et al. | |

FOREIGN PATENT DOCUMENTS

| | | |
|---|---|---|
| JP | 2009-296694 A | 12/2009 |
| JP | 2012-249506 A | 12/2012 |
| JP | 2015-053753 A | 3/2015 |
| JP | 2015-101157 A | 6/2015 |
| JP | 2015-223027 A | 12/2015 |

* cited by examiner

WIRING MEMBER

CROSS REFERENCE TO RELATED APPLICATIONS

This application is a national phase of PCT application No. PCT/JP2020/000369, filed on 9 Jan. 2020, which claims priority from Japanese patent application No. 2019-074938, filed on 10 Apr. 2019, all of which are incorporated herein by reference.

TECHNICAL FIELD

The present disclosure relates to a wiring member.

BACKGROUND

Patent Document 1 discloses a wire harness fixing structure in which, in a state where a flat circuit body is mounted on a flat circuit body holding member and a wire harness is further mounted on the flat circuit body, these members are bound around by a binding member.

PRIOR ART DOCUMENT

Patent Document

Patent Document 1: JP 2009-296694 A
Patent Document 2: JP 2003-079034 A

SUMMARY OF THE INVENTION

Problems to be Solved

However, in the case of the wire harness fixing structure disclosed in Patent Document 1, the positional relationship between the flat circuit body and the wire harness is not stable. On the other hand, in the flat circuit body itself, the positional relationship between a plurality of conductors inside the flat circuit body is stable. However, a wire cannot be attached afterwards.

In view of this, an object is to provide a technique that can stabilize the positional relationship between a plurality of wires while enabling a wire to be attached afterwards.

Means to Solve the Problem

A wiring member according to the present disclosure is a wiring member including a plurality of wires, and a holding member configured to hold the plurality of wires, wherein the plurality of wires include a power line and a communication line that extend in the same direction, the holding member includes a plurality of wire holding portions that each can hold a wire at a fixed position, the power line is held by a first wire holding portion of the plurality of wire holding portions, the communication line is held by a second wire holding portion of the plurality of wire holding portions, and at least one of the plurality of wire holding portions is formed to be capable of retrofittably holding the wire.

Effect of the Invention

According to the present disclosure, it is possible to stabilize a positional relationship between a plurality of wires while enabling a wire to be attached afterwards.

DETAILED DESCRIPTION TO EXECUTE THE INVENTION

Description of Embodiments of Present Disclosure

Figure 1:
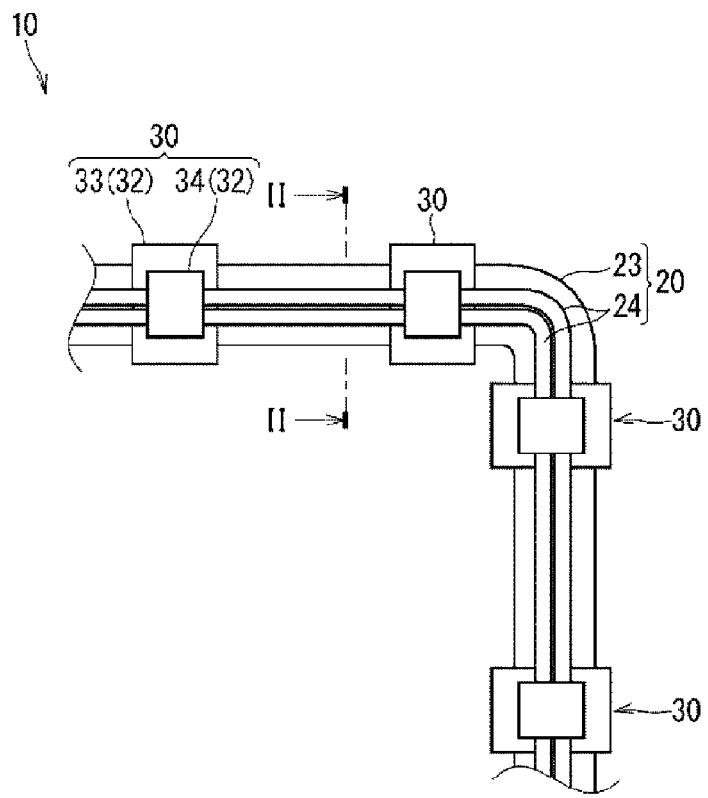
FIG. 1 is a plan view showing a wiring member according to a first embodiment.

First, embodiments of the present disclosure will be listed and described.

The wiring member of the present disclosure is as follows.

(1) A wiring member according to the present disclosure is a wiring member including a plurality of wires, and a holding member configured to hold the plurality of wires, wherein the plurality of wires include a power line and a communication line that extend in the same direction, the holding member includes a plurality of wire holding portions that each can hold a wire at a fixed position, the power line is held by a first wire holding portion of the plurality of wire holding portions, the communication line is held by a second wire holding portion of the plurality of wire holding portions, and at least one of the plurality of wire holding portions is formed to be capable of retrofittably holding the wire. The power line and the communication line can be positioned using the holding member. In this manner, the positional relationship between the power line and the communication line can be stabilized. Further, at least one of the plurality of wire holding portions is capable of retrofittably holding a wire that is attachable afterwards. In this manner, it is possible to stabilize the positional relationship between the plurality of wires while enabling a wire to be attached afterwards.

(2) A configuration is also possible in which the plurality of wire holding portions include a third wire holding portion capable of retrofittably holding a parallel wire that extends in the same direction as the power line and the communication line of the plurality of wires. In this manner, it is possible to hold the parallel wire that is parallel to the power line and the communication line, and stabilize the positional relationship of the parallel wire in addition to the power line and the communication line. Further, the parallel wires can be attached afterwards. For this reason, it is possible to cause the holding member to hold the parallel wires after the wiring including the power line and the communication line and the wiring including the parallel wires are assembled separately.

(3) A configuration is also possible in which the holding member further includes a stabilizing mechanism that is in contact with the parallel wire in a state corresponding to a number of the parallel wire and causes the third wire holding portion to hold the parallel wire at a fixed position. In this manner, even if the number of parallel wires varies, it is possible to stabilize the positional relationship of the parallel wires.

(4) A configuration is also possible in which the holding member is provided at a plurality of locations spaced apart from each other along a longitudinal direction of the power line and the communication line. In this manner, it is possible to bend the power line and the communication line after attaching the holding member to the power line and the communication line.

(5) A configuration is also possible in which the holding member is provided at a location at which the power line and the communication line bend, and regulates the power line and the communication line into a bent state. In this manner, it is possible to regulate the power line and the communication line into a bent state with the holding member.

(6) A configuration is also possible in which the power line includes a core wire and an insulating coating that covers the core wire, and the core wire and the insulating coating are formed flat. In this manner, the height dimension of the wiring member can be reduced.

(7) The core wire may also be a twisted wire. In this manner, the flatly formed power line can be easily bent.

DETAILED DESCRIPTION OF EMBODIMENTS OF DISCLOSURE

Specific examples of the wiring member of the present disclosure will be described below with reference to the drawings. It should be noted that the present disclosure is not limited to these examples, but is indicated by the scope of the claims, and all changes that come within the meaning and range of equivalency of the claims are intended to be embraced therein.

First Embodiment

Figure 2:
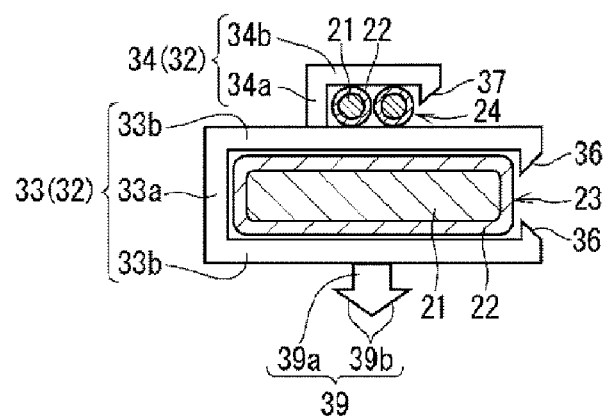
FIG. 2 is a cross-sectional view taken along line II-II in FIG. 1.

Hereinafter, a wiring member according to a first embodiment will be described. FIG. 1 is a plan view showing a wiring member 10 according to the first embodiment. FIG. 2 is a cross-sectional view taken along line II-II in FIG. 1.

The wiring member 10 is provided with a plurality of wires 20 and a holding member 30. The holding member 30 holds the plurality of wires 20 in a state of being positioned at a fixed position.

Here, each of the wires 20 is an insulated wire. The insulated wire includes a core wire 21 and an insulating coating 22 that covers the core wire 21. The wiring member 10 may include a cable in which a plurality of insulated wires are covered with a sheath.

The core wire 21 is formed using a conductor such as copper, a copper alloy, aluminum, or an aluminum alloy as the material. The core wire 21 may be a single core wire constituted by a single strand. The core wire 21 may include a plurality of strands. If the core wire 21 includes a plurality of strands, the strands may or may not be twisted.

The insulating coating 22 is formed by an insulating material. Typically, the insulating coating 22 is formed by a resin such as polyvinyl chloride (PVC) or polyethylene (PE). The insulating coating 22 may be formed through press-molding a resin around the core wire 21, or applying an insulating paint such as enamel around the core wire 21. The insulating coating 22 is formed in a shape conforming to the shape of the core wire 21. The insulating coating 22 is favorably formed at approximately the same thickness around the core wire 21.

The plurality of wires 20 include a power line 23 and communication lines 24. The power line 23 and the communication lines 24 extend in the same direction. In the following description, if the power line 23 and the communication lines 24 need to be distinguished from each other, the reference signs 23 and 24 may be referred to, and if the power line 23 and the communication lines 24 do not need to be distinguished from each other, they may be collectively called the wires 20.

Figure 3:
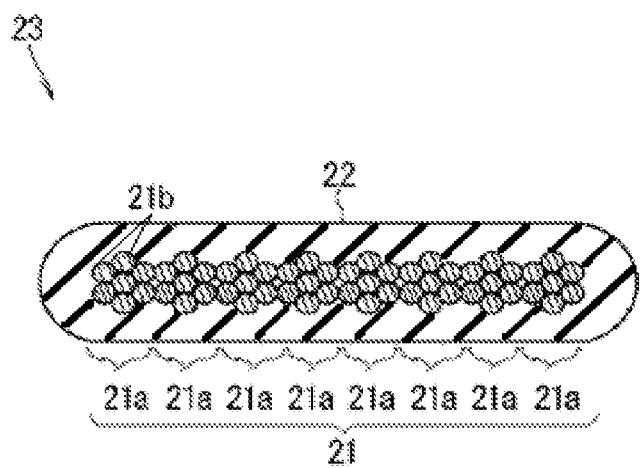
FIG. 3 is a front view showing a power line according to the first embodiment.

FIG. 3 is a front view showing the power line 23 according to the first embodiment. The power line 23 is a wire for supplying power to a connection destination of the wiring member 10. The core wire 21 and the insulating coating 22 of the power line 23 are formed flat. The core wire 21 of the power line 23 is a twisted wire 21a. The twisted wire 21a is formed by twisting a plurality (seven in the example shown in FIG. 3) of strands 21b. One or a plurality (eight in the example shown in FIG. 3) of the twisted wires 21a are included. In the example shown in FIG. 3, the plurality of twisted wires 21a collectively form one conductive path. Here, the twisted wires 21a are not flat. The plurality of strands 21b are twisted such that the lateral cross-sections of the twisted wires 21a are formed in approximately circular shapes. Here, since the plurality of twisted wires 21a are arranged flat, the core wire 21 is formed flat. However, the twisted wires 21a may be formed flat. In the example shown in FIG. 3, the eight twisted wires 21a are arranged side by side in a row. The plurality of twisted wires 21a may be arranged in a plurality of rows as long as the twisted wires 21 are arranged flat. The twisted wires 21a are in contact with each other inside the insulating coating 22. However, the twisted wires 21a may also separate from each other inside the insulating coating 22, and in contact with each other at a portion that has no insulating coating 22 such as an end portion of the power line 23. The flat core wire 21 of the power line 23 may be a flat plate. The flat core wire 21 of the power line 23 may also be formed by the plurality of strands 21b being arranged so as to extend in parallel to each other.

The communication lines 24 are wires for transmitting signals between the destinations to which the wiring member 10 is connected. The communication lines 24 are not formed flat. The communication lines 24 are round wires. The communication lines 24 may also be flat wires.

Here, the allowable current value of the power line 23 is set higher than the allowable current value of the communication lines 24. For this reason, the transverse cross-sectional area of the core wire 21 of the power line 23 is larger than the lateral cross-sectional area of the core wire 21 of the communication line 24.

In the example shown in FIG. 2, the one power line 23 is provided. The one power line 23 is a power line on the positive side, for example. However, the number of the power line 23 is not limited to this. Two or more power lines 23 may also be provided. Two or more power lines 23 only on the positive side may be provided. In other words, a plurality of power lines for a plurality of different circuits may be included. Two or more power lines including a power line on the negative side may be provided. That is, a power line for one closed circuit may be included. Note that, in some cases, the power line on the positive side is simply called a power line, and the power line on the negative side is called a ground line.

In the example shown in FIG. 2, two communication lines 24 are provided. The two communication lines 24 are communication lines 24 for CAN (Controller Area Network) communication, for example. Note that the number of the communication lines is not limited to this. One or three or more communication lines may be provided. If one communication line is provided, the communication line is a communication line for LIN (Local Interconnect Network) communication, for example. The above describes an example in which the communication line includes one bus wiring. The communication line may include a plurality of bus wirings.

Figure 4:
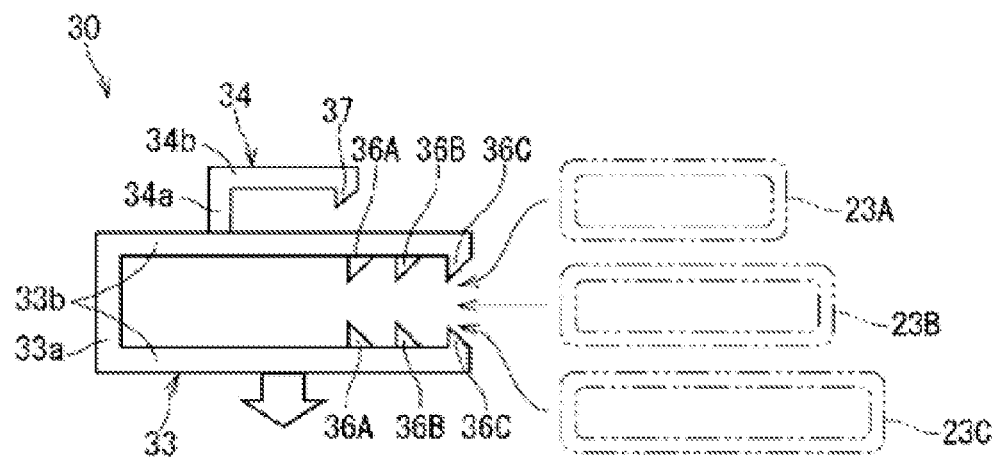
FIG. 4 is a front view showing a holding member according to the first embodiment.

FIG. 4 is a front view showing the holding member 30 according to the first embodiment. The holding member 30 includes a plurality of wiring holding portions 32. Each of the plurality of wire holding portions 32 can hold the wire 20 at the fixed position. The wire holding portions 32 each include a housing space in which the wires 20 can be held at a fixed position. The first wire holding portion 33 and the second wire holding portion 34 are included in the plurality of wire holding portions 32. In the following description, if the first wire holding portion 33 and the second wire holding portion 34 need to be distinguished from each other, the reference signs 33 and 34 are referred to, and if the first and second wire holding portions 33 and 34 do not need to be distinguished from each other in particular, the first and second wire holding portions 33 and 34 may be collectively called the wire holding portions 32. The power line 23 is held in the first wire holding portion 33. The communication lines 24 are held in the second wire holding portion 34. The holding member 30 is a member formed in one piece through molding using a material such as a resin.

At least one of the plurality of wire holding portions 32 is formed such that the wire 20 can be retrofittably held. Here, the first wire holding portion 33 and the second wire holding portion 34 are formed such that the wire 20 can be attached and retrofittably held. The state in which the wire 20 can be attached afterwards means that the wire 20 that is to be attached afterwards and the holding member 30 are not formed in one piece. The state in which the wire 20 can be attached afterwards can also be understood as a state in which the holding member 30 can hold the wire 20 that was formed separately from the holding member 30. The wire holding portion 32 to which the wire 20 can be attached afterwards may be formed such that the wire 20 can be held in an attachable/detachable manner. Here, the first wire holding portion 33 and the second wire holding portion 34 are formed such that the wire 20 can be held in an attachable/detachable manner. The wire 20 being attachable/detachable means that the wire 20 can be attached afterwards and the wire 20 that is held by the holding member 30 can be detached from the holding member 30 without the holding member 30 being broken. Accordingly, the wire 20 being attachable afterwards includes a case in which the wire 20 can be attached and detached, and a case in which the holding member 30 needs to be broken when the wire 20 held by the holding member 30 is detached from the holding member 30.

The first wire holding portion 33 is formed in a groove shape. The first holding portion includes the bottom wall 33a and a pair of side walls 33b. The pair of side walls 33b are provided so as to stand at the two edges of the bottom wall 33a. The space between the leading end portions of the side walls 33b is open. The power line 23 can be inserted through the opening. The housing space of the first wire holding portion 33 is formed in a shape that conforms to the power line 23. Here, the side walls 33b are formed longer than the bottom wall 33a. In other words, the dimension from the opening to the bottom wall 33a is longer than the dimension between the pair of the side walls 33b. The bottom wall 33a is formed to have a length corresponding to the thickness of the power line 23. The side walls 33b are formed to have a length corresponding to the width of the power line 23. However, the side walls 33b may be formed shorter than the bottom wall. In other words, the dimension from the opening to the bottom wall may be shorter than the dimension between the pair of side walls. In this case, the bottom wall is formed to have the length corresponding to the width dimension of the power line 23. The side walls are formed to have the width corresponding to the width dimension of the power line 23.

The first wire holding portion 33 is provided with pressing pieces 36. The pressing pieces 36 are provided at the leading ends of the side walls 33b. The pressing pieces 36 protrude so as to cover the opening of the first wire holding portion 33. The pressing pieces 36 protrude toward the opposing side wall 33b. The pressing pieces 36 are provided at positions of the pair of side walls 33b that are spaced apart from the bottom wall 33a by the same length dimension. Note that, the pressing pieces 36 may be only formed on one of the pair of side walls 33b.

The pressing pieces 36 are provided at a plurality of positions that are at different distances from the bottom wall 33a. In this manner, as shown in FIG. 4, it is possible to house multiple kinds of power lines 23 with various width dimensions at a fixed position. Specifically, the pressing pieces 36 provided at a plurality of positions are called pressing pieces 36A, 36B, and 36C in order from a position close to the bottom wall 33a. Also, multiple kinds of power lines 23 having different widths are called power lines 23A, 23B, and 23C in ascending order of width. In this case, when the power line 23A is fully housed in the first wire holding portion 33, the pressing pieces 36A act as detents of the power line 23A. Similarly, when the power line 23B is fully housed in the first wire holding portion 33, the pressing pieces 36B act as detents of the power line 23B. Similarly, when the power line 23C is fully housed in the first wire holding portion 33, the pressing pieces 36C act as detents of the power line 23C. It is favorable that, when the power line 23C corresponding to the pressing pieces 36C is housed in the first wire holding portion 33, the pressing pieces 36A and 36B that are closer to the bottom wall 33a can elastically deform toward the side walls 33b to which the base end portion is connected. In this manner, the side walls 33b are unlikely to protrude outward when the power line 23C is housed in the first wire holding portion 33.

The second wire holding portion 34 is provided on the outer surface of the first wire holding portion 33. Here, the second wire holding portion 34 is provided on the outer surface of the side wall 33b, but may also be provided on the outer surface of the bottom wall 33a. The second wire holding portion 34 includes a first wall 34a that protrudes from the first wire holding portion 33 and a second wall 34b that protrudes from the leading end of the first wall 34a. The second wire holding portion 34 is formed in an L shape. The second wall 34b extends along the outer surface of the first wire holding portion 33 at a position spaced apart from the outer surface of the first wire holding portion 33. The space between the leading end of the second wall 34b and the outer surface of the first wire holding portion 33 is open. The communication lines 24 can be inserted through this opening. The second wire holding portion may be formed so as to include a plurality of walls provided at intervals on the outer surface of the first wire holding portion 33. In this case, the outer surface of the first wire holding portion 33 forms the bottom of the housing space of the second wire holding portion.

The housing space of the second wire holding portion 34 is formed to be capable of collectively housing the two communication lines 24. Here, the second wall 34b is formed longer than the first wall 34a. That is, the dimension from the opening to the first wall 34a is longer than the dimension from the second wall 34b and the outer surface of the first wire holding portion 33. However, the second wall may also be formed shorter than the first wall. That is, the dimension between the second wall and the outer surface of the first wire holding portion 33 may be formed shorter than the dimension from the opening to the first wall.

The second wire holding portion may separately house a plurality of communication lines 24 that form a plurality of bus wirings. The second wire holding portion in this case is formed in a T shape that further includes a third wall that extends in the opposite direction to the second wall 34b, for example.

The second wire holding portion 34 is provided with a pressing piece 37. The pressing piece 37 is provided at the leading end of the second wall 34b. The pressing piece 37 protrudes so as to cover the opening of the second wire holding portion 34. The pressing piece 37 protrudes toward the outer surface of the first wire holding portion 33. The pressing piece 37 may be formed on the outer surface of the first wire holding portion 33.

The first wire holding portion 33 and the second wire holding portion 34 respectively hold the power line 23 and the communication lines 24 in a state of being spaced apart from each other. In this manner, noise in the communication lines 24 due to the power line 23 is likely to be a fixed value. At this time, the power line 23 and the communication lines 24 may be spaced apart from each other to an extent that a shield is not required. A shield may also be provided between the power line 23 and the communication lines 24. At least one of the power line and communication lines may be a shield wire in which the circumstance of the core wire 21 is covered by a shield.

The holding member 30 is provided with a fixing portion 39 for fixing the wiring member 10 to the attachment target. In the example shown in FIG. 2, the fixing portion 39 is a clip 39. The clip 39 can be inserted and fixed to a hole that is formed in the target. The clip 39 includes a column 39a and a locking piece 39b. The column 39a is formed protruding from the wire holding portion 32. The locking piece 39b is provided at a leading end of the column 39a. The locking piece 39b is provided to laterally expand from the column 39a. The locking piece 39b is formed larger than the hole. When the clip 39 is inserted into the hole and the locking piece 39b abuts against the circumferential edge portion of the hole, the locking piece 39b can elastically deform to contract to be smaller than the hole by receiving a force from the circumferential edge portion of the hole. Furthermore, the locking piece 39b can elastically restore so as to expand to be larger than the hole after passing the hole. In this manner, the clip 39 can be inserted and locked to the hole.

The fixing portion 39 is provided at the outer surface on the side wall 33b. The fixing portion 39 may also be provided on the outer surface of the bottom wall 33a. The fixing portion 39 is provided on the side wall 33b that is opposite to the side wall 33b on which the second wire holding portion 34 is provided. The fixing portion 39 may also be provided on the same side wall 33b to the side wall 33b on which the second wire holding portion 34 is provided.

The column 39a of the clip 39 extends in the thickness direction of the flat power line 23. The column of the clip may be provided so as to extend in the width direction of the flat power line 23.

Note that, the holding member 30 need not necessarily be provided with the fixing portion 39. Also, even if the holding member 30 is provided with a fixing portion, the fixing portion need not necessarily be the clip 39. The fixing portion may also be a hole, for example. Due to the bolt passing into the hole or the clip being inserted into the hole, the holding member 30 is fixed to the target.

The holding members 30 are provided at a plurality of positions spaced apart from each other along the longitudinal direction of the power line 23 and the communication lines 24. The power line 23 and the communication lines 24 are bent between the two holding members 30. In the example shown in FIG. 1, the power line 23 and the communication lines 24 bend in the direction along the flatly-formed main surface of the power line 23. However, the power line 23 and the communication lines 24 may bend in another direction other than this. The power line 23 and the communication lines 24 may bend in the normal direction with respect to the flatly formed main surface of the power line 23. The power line 23 and the communication lines 24 may also bend in the direction in which the power line 23 is twisted. The power line 23 and the communication lines 24 may be bent at a plurality of positions. The plurality of positions may be between the one pair of the holding members 30 or between another pair of holding members 30. At each position, the direction in which the lines bend may be the same or different. Further, in the example shown in FIG. 1, although the power line 23 and the communication lines 24 bend at a 90°, but the bending angle may also be another value.

<Variation of Wiring Member>

Figure 5:
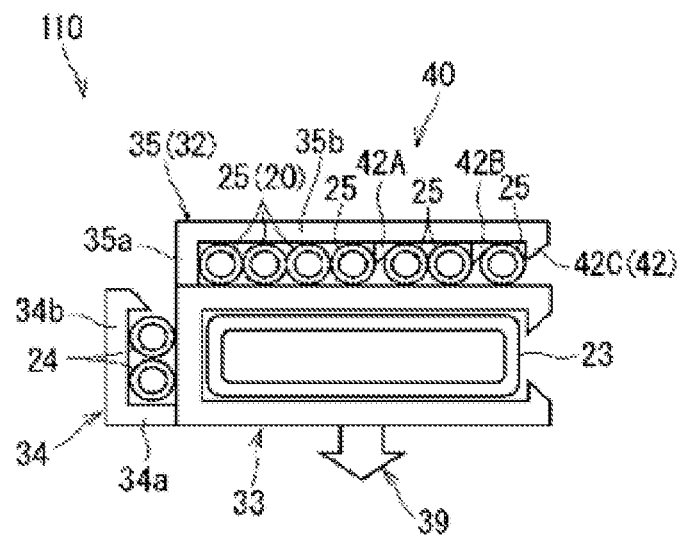
FIG. 5 is a front view showing a variation of the wiring member according to the first embodiment.

FIG. 5 is a front view showing a variation of the wiring member 10 according to a first embodiment. The wiring member 110 according to the variation is provided with a plurality of wires 20 and a holding member 130. The plurality of wires 20 according to the present embodiment are different from the plurality of wires 20 according to the first embodiment in that parallel wires 25 are further included. The holding member 130 is different from the above holding member 30 in that a third wire holding portion 35 is further included in the plurality of wire holding portion 32.

The parallel wires 25 are wires that extend in the same direction as the power line 23 and the communication lines 24. One or a plurality (seven in the example shown in FIG. 5) of parallel wires 25 are provided. The parallel wires 25 may include a wire that supplies power, similarly to the power line 23, a wire that transfers signals, similarly to the communication lines 24, or may include both of these types of wires. In the example shown in FIG. 5, the plurality of parallel wires 25 are in the same size, but the parallel wires 25 may be different in size.

The third wire holding portion 35 is capable of retrofittably holding the parallel wires 25. Similarly to the second wire holding portion 34, the third wire holding portion 35 is formed in an L shape including the first wall 35a and the second wall 35b. Here, the second wire holding portion 34 is provided on the outer surface of the bottom wall 33a, and the third wire holding portion 35 is provided on the outer surface of the side wall 33b. Accordingly, in the second wire holding portion 34, the first wall 34a protrudes from the outer surface of the bottom wall 33a, and the second wall 34b extends along the outer surface of the bottom wall 33a at a position spaced apart from the outer surface of the bottom wall 33a. In the third wire holding portion 35, the first wall 35a protrudes from the outer surface of the side wall 33b, and the second wall 35b extends along the outer surface of the side wall 33b at a position spaced apart from the outer surface of the side wall 33b. However, the second wire holding portion 34 and the third wire holding portion 35 may also be provided on the outer surface of the same side wall 33b.

The second wall 35b of the third wire holding portion 35 is formed longer than the second wall 34b of the second wire holding portion 34. In this manner, the third wire holding portion 35 can hold more wires than the second wire holding portion 34.

The holding member 30 further includes a stabilizing mechanism 40. The stabilizing mechanism 40 is provided in the third wire holding portion 35. The stabilizing mechanism 40 is in contact with the parallel wires 25 in a state corresponding to the number of the parallel wires 25 and causes the third wire holding portion 35 to hold the parallel wires 25 in a fixed position. In the example shown in FIG. 5, the stabilizing mechanism 40 includes a plurality of pressing pieces 42. The plurality of pressing pieces 42 are provided on the inner surface of the second wall 35b. The plurality of pressing pieces 42 are provided at a plurality of positions that are at different distances from the first wall 35a. In this manner, even if the number of parallel wires 25 varies, the parallel wires 25 can be housed in a fixed position.

Specifically, the pressing pieces 42 provided at a plurality of positions are pressing pieces 42A, 42B, and 42C in order from the position close to the first wall 35a. Four of the parallel wires 25 can be housed between the first wall 35a and the pressing piece 42A. Two of the parallel wires 25 can be housed between the pressing piece 42A and the pressing piece 42B. One of the parallel wires 25 can be housed between the pressing piece 42B and the pressing piece 42C. In this manner, even if the parallel wires 25 varies in number, different numbers of parallel wires 25 can be appropriately held at a fixed position in the third wire holding portion 35.

Specifically, if there is one parallel wire 25, the parallel wire 25 is housed between the pressing piece 42B and the pressing piece 42C. If there are two parallel wires 25, the parallel wires 25 are housed between the pressing piece 42A and the pressing piece 42B. If there are three parallel wires 25, two of the parallel wires 25 are housed between the pressing piece 42A and the pressing piece 42B, and one of the parallel wires 25 is housed between the pressing piece 42B and the pressing piece 42C. If there are four parallel wires 25, the parallel wires 25 are housed between the first wall 35a and pressing piece 42A. If there are five parallel wires 25, four of the parallel wires 35a are housed between the first wall 35a and the pressing piece 42A, and one of the parallel wire 25 is housed between the pressing piece 42B and the pressing piece 42C. If there are six parallel wires 25, four of the parallel wires 25 are housed between the first wall 35a and the pressing piece 42A, and two of the parallel wires 35a are housed between the pressing piece 42A and the pressing piece 42B. If there are seven parallel wires 25, four of the parallel wires 25 are housed between the first wall 35a and the pressing piece 42A, and two of the parallel wires 25 are housed between the pressing piece 42A and the pressing piece 42B, and one of the parallel wires 25 is housed between the pressing piece 42B and the pressing piece 42C.

Of course, the number and arrangement of the plurality of pressing pieces 42 that form the stabilizing mechanism 40 in the third wire holding portion 35 are not limited to the above. For example, the pressing pieces 42 may be two or four or more. Also, the space between the pressing pieces 42 and the number of wires to be housed between the pressing pieces 42 and the first wall 35a can be set as appropriate.

<Effects of First Embodiment and the Like>

According to the present embodiment, the power line 23 and the communication lines 24 can be positioned by the holding members 30 and 130. In this manner, the positional relationship between the power line 23 and the communication lines 24 can be stabilized. At least one of the plurality of wire holding portions 32 is formed to be to be capable of retrofittably holding the wire 20. In this manner, it is possible to stabilize the positional relationship between the plurality of wires 20 while enabling the wire 20 to be attached afterwards. Due to the positional relationship between the power line 23 and the communication lines 24 being stabilized, the state of noise that occurs in the communication lines 24 due to the power line 23 is stabilized. For this reason, it is possible to eliminate the need of a measure against the noise, or to simplify the measure against the noise even if it is needed.

The holding members 30 and 130 are provided at a plurality of locations spaced apart from each other along the longitudinal direction of the power line 23 and the communication lines 24. In this manner, it is possible to bend the power line 23 and the communication lines 24 after attaching the holding member 30.

Since the power line 23 is formed flat, the height dimension of the wiring member 10 can be reduced. Since the core wire 21 of the power line 23 is the twisted wire 21a, the flatly formed power line 23 can be readily bent.

Furthermore, with the holding member 130, the third wire holding portion 35 in the holding member 130 can hold the parallel wires 25. In this manner, it is possible to stabilize the power line between the parallel wires 25, as well as the power line 23 and the communication lines 24. Furthermore, the third wire holding portion 35 is capable of retrofittably holding the parallel wires 25. For this reason, after the wiring including the power line 23 and the communication lines 24 and the wiring including the parallel wires 25 are separately assembled, the parallel wires 25 can be held by the holding member 130. Since the stabilizing mechanism 40 is formed in the third wire holding portion 35, even if the number of the parallel wires 25 varies, the positional relationship between the parallel wires 25 can be stabilized.

Second Embodiment

Figure 6:
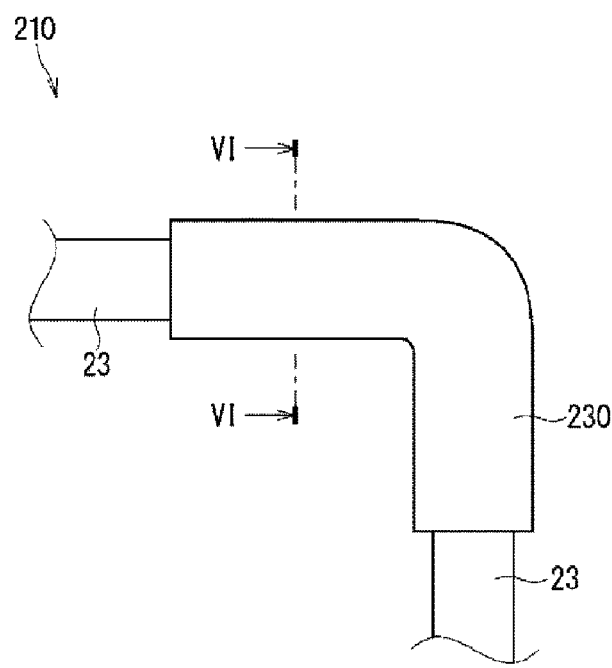
FIG. 6 is a plan view showing the wiring member according to a second embodiment.
Figure 7:
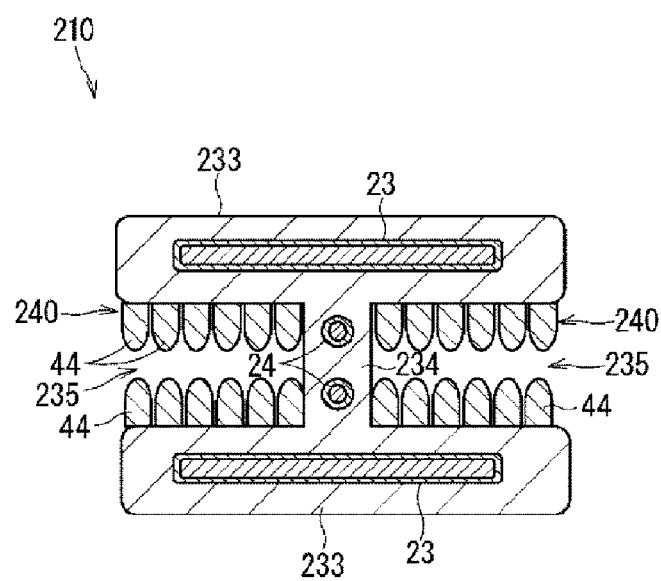
FIG. 7 is a cross-sectional view taken along line IV-IV in FIG. 6.

The wiring member according to a second embodiment will be illustrated. FIG. 6 is a plan view showing the wiring member 210 according to the second embodiment. FIG. 7 is a cross-sectional view taken along line VI-VI in FIG. 6. Note that, in the description of the present embodiment, the constituent elements that are similar to those described above will be given the identical reference signs and the descriptions thereof will be omitted.

In this example, the shape of the holding member 230 is different from the shapes of the above holding members 30 and 130. Specifically, the holding member 230 is the same as the above holding member 130 in that the wire 20 can be attached to a third wire holding portion 235 afterwards. The holding member 230 is different from the above holding members 30 and 130 in that a first wire holding portion 233 and second wire holding portions 234 are not formed such that the wire 20 can be attached afterwards. The holding member 230 is formed in one piece with the power lines 23 and the communication lines 24.

Specifically, in this example, the two power lines 23 are provided. The two power lines 23 are held by the holding member 230 at the positions spaced apart from each other in the thickness direction. The communication line 24 is located between the power lines 23. The two communication lines 24 are arranged in the same direction as the direction in which the two power lines 23 are arranged. The communication line 24 is located at an intermediate portion in the width direction of the power lines 23.

The holding member 230 is formed in an H-shape in which three plate-like portions are combined. The two of the three plate-like portions are first wire holding portions 233, and the other one is a second wire holding portion 234. It can be regarded that the two first wire holding portion 233 are provided to be spaced apart from each other. Also, it can be regarded that the second wire holding portion 234 is provided at a location that connects the intermediate portions of the first wire holding portions 233. Note that, the holding member 230 can be configured such that at least one of the power lines 23 and the communication lines 24 can be attached thereto afterwards. In this case, for example, a groove that can house the power lines 23 or the communication lines 24 attached afterwards can be formed in the plate-like portions.

The spaces between the end portion in the width direction of the two first wire holding portions 233 are open. The spaces surrounded by the two first wire holding portion 233 and the second wire holding portion 234 are third wire holding portions 235. Two third wire holding portions 235 are provided. The two third wire holding portions 235 can house the parallel wires 25 respectively.

Stabilizing mechanisms 240 are respectively provided in the third wire holding portion 235. The stabilizing mechanisms 240 are different from the above stabilizing mechanism 40 in that the stabilizing mechanisms 240 hold the parallel wires 25 in an elastically deformed state. Specifically, the stabilizing mechanism 240 includes elastic pieces 44. The elastic pieces 44 may be formed by an elastic material such as elastomer including rubber. The elastic pieces 44 may be elastically formed as porous such as a foamed resin including a sponge. The elastic pieces 44 may be elastically formed like a plate spring. The elastic pieces 44 are provided so as to face each other. The elastic pieces 44 are provided on the inner surfaces of the two first wire holding portions 233. The parallel wires 25 can be sandwiched and held between the elastic pieces 44. However, the elastic pieces may be provided at only one of the two first wire holding portions 233. The elastic pieces 44 facing each other are spaced apart from each other and prevented from contacting each other. However, the elastic pieces 44 facing each other may also be in contact with each other.

The plurality of elastic pieces 44 are provided so as to be arranged from the second wire holding portion 234 side toward the opening on the inner surface of the one first wire holding portions 233. However, only one elastic piece may be provided on the inner surface of the one first wire holding portion 233. A configuration is also possible in which one elastic piece has the same size as the interval between the two first wire holding portions 233 and is fully housed in the third wire holding portion 235. In this case, a slit that runs from the opening toward the bottom portion of the third wire holding portion 235 is favorably formed in each of the elastic pieces. The parallel wires 25 are inserted and held in these slits.

Figure 8:
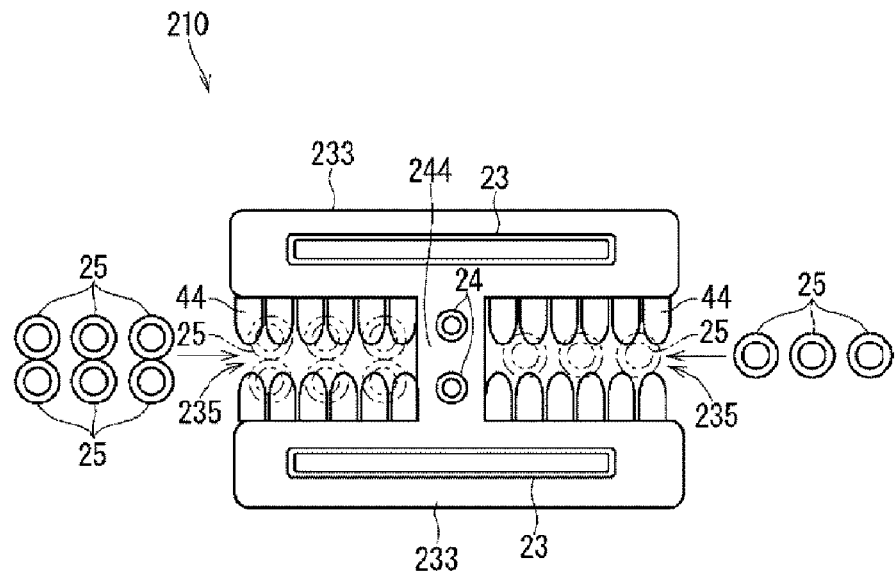
FIG. 8 is an illustrative diagram showing how parallel wires are housed in the holding member.

FIG. 8 is an illustrative diagram showing how the parallel wires 25 are housed in the holding member 230. In the example shown in FIG. 8, six parallel wires 25 are housed in one of the two third wire holding portions 235, and three parallel wires 25 are housed in the other third wire holding portion 235. In this case, the deformation amount of the elastic pieces 44 in the third wire holding portion 235 in which the six parallel wires 25 are housed is larger than the deformation amount of the elastic piece 44 in the third wire holding portion 35 in which the three parallel wires 25 are housed. In other words, the stabilizing mechanism 240 can hold parallel wires 25 of different numbers at fixed positions due to the deformation amount of the elastic pieces 44 changing.

As shown in FIG. 6, the holding member 230 is provided at a position at which the power line 23 and the communication lines 24 bend. The holding member 230 regulates the power line 23 and the communication lines 24 into a bent state. The holding member 230 can receive a reactive force of the power line 23 and the communication lines 24 that attempt to return to straight from a bent state. For example, after the holding member 230 is linearly formed in one piece with the power lines 23 and the communication lines 24, the holding member 230 is bent and deformed at the temperature at which the holding member 230 can easily deform, the holding member 230 is cooled to be fixed in this state, and thus the holding portion can be held in a state in which the holding portion is deformed by bending. Of course, the holding member 230 need not necessarily be provided at the position at which the power line 23 and the communication lines 24 can bend, and the power line 23 and the communication lines 24 may only be provided at partial locations at which the power line 23 and the communication lines 24 linearly extend.

<Effects of Second Embodiment and the Like>

According to the second embodiment as well, except for the operation and effects due to the holding members 30 and 130 dispersedly being arranged, similar operation and effects to the above first embodiment can be obtained.

According to the second embodiment, the holding member 230 is provided at a location at which the power line 23 and the communication line 24 bend. The holding member 230 regulates the power line 23 and the communication line 24 in the bent state.

Application Example to Vehicle

Figure 9:
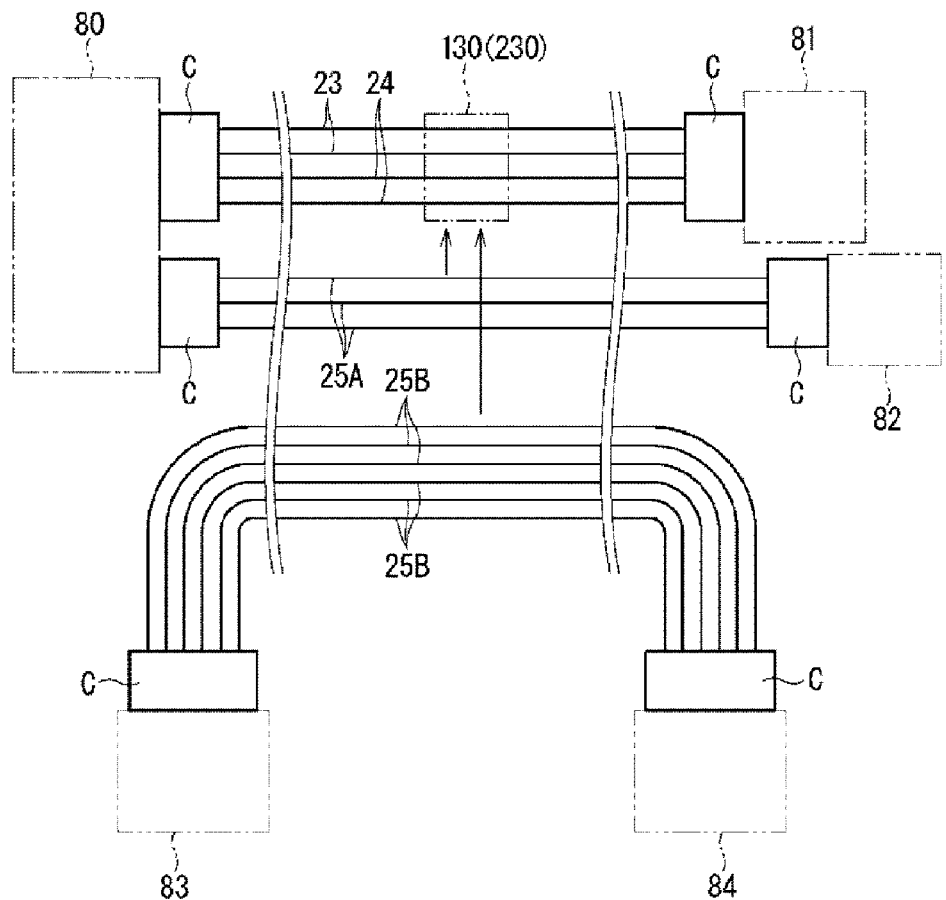
FIG. 9 is an illustrative diagram showing an example in which the wiring member is applied to a vehicle.

FIG. 9 is an illustrative diagram showing an example in which the wiring members 10, 110, and 210 are applied to a vehicle. In the example shown in FIG. 9, one end portion and the other end portion of the power lines 23 and the communication lines 24 are connected to the same devices 80 and 81. The power lines 23 and the communication lines 24 extend on the same path from the one end portion to the other end portion. The holding members 30, 130, and 230 are provided in at least part of the intermediate portion excluding the end portion (portion of connector C) which is connected to the devices 80 and 81 of the power lines 23 and the communication lines 24. Here, the holding members 130 and 230 that can hold the parallel lines 25 are provided.

The one end portions of the parallel lines 25A are connected to the device 80 which is the same as the device to which the power lines 23 and the communication lines 24 are connected. The other end portion of the parallel lines 25A is connected to the device 82 that is different from the devices 80 and 81 to which the power lines 23 and the communication lines 24 are connected. The one end portion and the other end portion of the parallel line 25B is connected to devices 83 and 84 which are different from the devices 80 and 81 to which the power lines 23 and the communication lines 24. Accordingly, a portion of the paths of the parallel lines 25A and 25B is the same as the paths of the power lines 23 and the communication lines 24. Another portion of the parallel lines 25A and 25B are different from the paths of the power lines 23 and the communication lines 24. Note that the one end portion and the other end portion of the parallel lines may be connected to the devices 80 and 81 that are the same device to which the power line 23 and the communication lines 24 are connected.

It is preferable that the holding members 130 and 230 that can house the parallel wires 25 are attached to a portion of the paths of the power lines 23 and the communication lines 24 that overlap with the paths of the parallel wires 25A and 25B. In this manner, the holding members 130 and 230 can hold the parallel wires 25. A configuration is also possible in which the holding member 30 that can house the parallel wire 25 is attached to a portion of the paths of the power line 23 and the communication lines 24 that do not overlap with the path of the parallel wire 25.

For example, the devices 80 and 81 to which the power lines 23 and the communication lines 24 are connected are conceivably a power supply communication relay device. The power supply communication relay device is a device that distributes the power supply to one or a plurality of devices 82 that are connected thereto, and relays communication between the one or plurality of devices 82 that are connected thereto. In this case, the power lines 23 are conceivably wires for supplying power to the power supply communication relay device. That is, the power lines 23 are wires for supplying power to the power supply distribution devices 80 and 81. For this reason, a comparatively large current flows through the power lines 23. Also, a voltage of 12 V is applied to the power lines 23, for example. Also, the communication lines 24 are conceivably a communication bus line (bus wiring).

For example, the parallel wires 25A are wires that connect the device 80 that is a power supply communication relay devices and the device 82. The device 82 is conceivably a body device, an information/entertainment device, or the like. The body device and the information/entertainment device are devices that are not directly related to traveling of an automobile. The body devices include various kinds of illumination devices, various kinds of actuators, operation switches thereof, and the like that are mounted in the automobile. The illumination devices conceivably include head lights, small lumps, brake lamps, fog lamps, interior lights, and the like, and the actuators conceivably include actuators such as power windows, and power slide doors. The information/entertainment devices are conceivably a music or movie reproduction equipment, speakers, auxiliary communication devices, and a navigation device. The parallel wires 25A may include the power lines or the communication lines, and are applied in accordance with the function of the device 82.

For example, the parallel wires 25B are wires that connect the devices 83 and 84 that are other than power supply communication relay devices. The devices 83 and 84 conceivably include driving devices, safety devices, and automatically operation devices. The driving devices are, for example, devices relating to steering, acceleration, and braking. The safety devices are, for example, devices relating to a safety driving assisting function such as an automatic braking system, an airbag, and the like. The automatic operation devices are devices relating to automatic operation of sensors (a perimeter monitoring camera, a distance sensor such as a radar) that monitors the periphery of an automotive. The parallel wires 25B may include the power lines or the communication lines, and are applied in accordance with the devices 83 and 84.

It is preferable that the body device, the information/entertainment device can be easily changed according to preference and the like of the user, in other words, easily customized From this viewpoint, it is preferable that the parallel wires 25A can be attached and detached to/from the third wire holding portions 35, 235 of the holding members 130, 230. Compared with the body device and information/entertainment device, the drive device, the safety device, the automatic operating device, and the like have less need to be easily customized From this viewpoint, it suffices if the parallel wires 25B can be attached to the third wire holding portions 35, 235 of the holding members 130, 230 afterwards, and the parallel wires 25B have less need to be attachable/detachable. Of course, the parallel wires 25B can be attached and detached to/from the third wire holding portion 35 and 235. In this case, maintenance of the parallel wires 25B can be facilitated. A configuration is also possible in which both the attachable/detachable wire holding portion and the wire holding portion that can be attached afterwards and cannot be attached and detached are provided as the third wire holding portion. Further, a configuration is also possible in which the parallel wires 25A are held by the wire holding portion to which wires are attachable/detachable, and the parallel wires 25B are by the wire holding portion to which wires are attachable afterwards but not attachable/detachable.

Variation

In the above description, it is assumed that the power lines 23 are formed flat, but the power lines 23 need not necessarily be flat. For example, the power lines 23 may also be round wires or the like.

Note that the configurations described in the above embodiments and variations can be combined with each other as long as no mutual contradiction arises.

LIST OF REFERENCE NUMERALS 10, 110, 210 Wire member
20 Wire holding portion
21 Core wire
22 Insulating coating
23 Power line
24 Communication line
25, 25A, 25B Parallel wire
30, 130, 230 Holding member
32 Wire holding portion
33, 233 First wire holding portion
33a Bottom wall
33b Side wall
34, 234 Second wire holding portion
34a First wall
34b Second wall
35, 235 Third wire holding portion
35a First wall
35b Second wall
36 Pressing piece
140, 240 Stabilizing mechanism
42A, 42B, 42C Pressing piece
44 Elastic piece
80, 81, 82, 83, 84 Devices
C Connector

What is claimed is:

1. A wiring member comprising:

a plurality of wires; and a holder configured to hold the plurality of wires, wherein the plurality of wires include a power line and a communication line that extend in the same direction, the holder is formed in a shape in which three plate-like portions are combined in an H-shape, and includes a plurality of wire holding portions that each can hold a wire at a fixed position, the power line is held by a first wire holding portion of the plurality of wire holding portions, the communication line is held by a second wire holding portion of the plurality of wire holding portions, the plurality of wire holding portions are provided so as to be divided into an inner portion of the plate-like portion and a portion surrounded by the three plate-like portions, and the wire holding portion provided at least a portion surrounded by the three plate-like portions is formed to be capable of retrofittably holding the wire, and a stabilizer is provided in the portion surrounded by the three plate-like portions to hold a wire in an elastically deformed state.

2. The wiring member according to claim 1, wherein the power line includes a core wire and an insulating coating that covers the core wire, the core wire and the insulating coating are formed flat, and of the three plate-like portions, each of inner portions of the two plate-like portions that are parallel to each other is a first wire holding portion that holds the power line.

3. The wiring member according to claim 2, wherein the plurality of wire holding portions include a third wire holding portion capable of retrofittably holding a parallel wire that extends in the same direction as the power line and the communication line of the plurality of wires, of the three plate-like portions, an inner portion of one plate-like portion which connects the remaining two plate-like portions that are parallel to each other is a second wire holding portion that holds the communication line, and the wire holding portion provided at a portion surrounded by the three plate-like portions is the third wire holding portion.

4. The wiring member according to claim 3, wherein the stabilizer is in contact with the parallel wire in a state corresponding to a number of the parallel wire and causes the third wire holding portion to hold the parallel wire at a fixed position.

5. The wiring member according to claim 1, wherein the stabilizer includes elastic pieces, and the elastic pieces are provided on an inner surface of the first wire holding portion.

* * * * *